United States Patent
Jamkhedkar et al.

(10) Patent No.: US 6,750,387 B2
(45) Date of Patent: Jun. 15, 2004

(54) MODE-ENHANCED HINDUSTANI MUSIC

(76) Inventors: Prabhakar Prahlad Jamkhedkar, D-1-80, 796, M.I.G Colony, Bandra (East), Mumbai (IN), 400051; Prashant Prabhakar Jamkhedkar, 7695 Topaz Cir., Dublin, CA (US) 94568

( * ) Notice: Subject to any disclaimer, the term of this patent is extended or adjusted under 35 U.S.C. 154(b) by 0 days.

(21) Appl. No.: 10/082,777

(22) Filed: Feb. 23, 2002

(65) Prior Publication Data

US 2003/0150318 A1 Aug. 14, 2003

Related U.S. Application Data

(60) Provisional application No. 60/351,118, filed on Jan. 25, 2002.

(51) Int. Cl.[7] ................................................. G09B 15/02
(52) U.S. Cl. ...................................... 84/483.2; 84/483.1
(58) Field of Search ............................ 84/483.1, 483.2, 84/470 R

(56) References Cited

U.S. PATENT DOCUMENTS

| | | | | | |
|---|---|---|---|---|---|
| 4,960,029 | A | * | 10/1990 | Nelson | ......................... 84/473 |
| 5,306,865 | A | * | 4/1994 | Dinnan et al. | ................. 84/622 |
| 6,452,080 | B1 | * | 9/2002 | Coonce | ...................... 84/477 R |

* cited by examiner

*Primary Examiner*—Kimberly Lockett
(74) *Attorney, Agent, or Firm*—Naren Chaganti

(57) ABSTRACT

Hindustani music is found to have an additional 22 thatas that can be scientifically and accurately computed. Together with the 10 thatas already identified, these newly identified and compiled thatas make a total 32 thatas. In a further aspect, a raag or melody is constructed by a combination of ascending and descending notes by selecting a thata, and computing a combination including at least 5 ascending or descending notes for the thata. Using this method, new raagas can be created using not only the existing 22 thatas, but also from the 22 newly discovered thatas. Further, new musical instruments can be constructed by applying the newly identified thatas. Students of music may be taught new tunes based on the 32 thatas.

5 Claims, 1 Drawing Sheet

32 THATAS (* indicates Thatas previously known)

```
GR. A  1/ 173  SA re ga ma PA dh ni *  (Bhairavi)
       2/ 174  SA re ga ma PA dh NI *  (Bhairav)
       3/ 175  SA re ga ma PA DH ni
       4/ 176  SA re ga ma PA DH NI GR. B  5/ 183  SA re ga MA PA dh ni
       6/ 184  SA re ga MA PA dh NI *  (Todi)
       7/ 185  SA re ga MA PA DH ni
       8/ 186  SA re ga MA PA DH NI GR. C  9/ 208  SA re GA ma PA dh ni
      10/ 209  SA re GA ma PA dh NI
      11/ 210  SA re GA ma PA DH ni
      12/ 211  SA re GA ma PA DH NI GR. D 13/ 218  SA re GA MA PA dh ni
      14/ 219  SA re GA MA PA dh NI *  (Pudi)
      15/ 220  SA re GA MA PA DH ni
      16/ 221  SA re GA MA PA DH NI *  (Marva)

GR. E 17/ 299  SA RE ga ma PA dh ni *  (Asawari)
      18/ 300  SA RE ga ma PA dh NI
      19/ 301  SA RE ga ma PA DH ni *  (Kafi)
      20/ 302  SA RE ga ma PA DH NI GR. F 21/ 309  SA RE ga MA PA dh ni
      22/ 310  SA RE ga MA PA dh NI
      23/ 311  SA RE ga MA PA DH ni
      24/ 312  SA RE ga MA PA DH NI GR. G 25/ 334  SA RE GA ma PA dh ni
      26/ 335  SA RE GA ma PA dh NI
      27/ 336  SA RE GA ma PA DH ni *  (Khamaj)
      28/ 337  SA RE GA ma PA DH NI *  (Bilawal)

GR. H 29/ 344  SA RE GA MA PA dh ni
      30/ 345  SA RE GA MA PA dh NI
      31/ 346  SA RE GA MA PA DH ni
      32/ 347  SA RE GA MA PA DH NI *  (Kalyan)
```

Fig. 1. 32 THATAS (* indicates Thatas previously known)

```
GR. A  1/ 173  SA re ga ma PA dh ni  * (Bhairavi)
       2/ 174  SA re ga ma PA dh NI  * (Bhairav)
       3/ 175  SA re ga ma PA DH ni
       4/ 176  SA re ga ma PA DH NI GR. B  5/ 183  SA re ga MA PA dh ni
       6/ 184  SA re ga MA PA dh NI  * (Todi)
       7/ 185  SA re ga MA PA DH ni
       8/ 186  SA re ga MA PA DH NI GR. C  9/ 208  SA re GA ma PA dh ni
      10/ 209  SA re GA ma PA dh NI
      11/ 210  SA re GA ma PA DH ni
      12/ 211  SA re GA ma PA DH NI GR. D 13/ 218  SA re GA MA PA dh ni
      14/ 219  SA re GA MA PA dh NI  * (Pudi)
      15/ 220  SA re GA MA PA DH ni
      16/ 221  SA re GA MA PA DH NI  * (Marva)

GR. E 17/ 299  SA RE ga ma PA dh ni  * (Asawari)
      18/ 300  SA RE ga ma PA dh NI
      19/ 301  SA RE ga ma PA DH ni  * (Kafi)
      20/ 302  SA RE ga ma PA DH NI GR. F 21/ 309  SA RE ga MA PA dh ni
      22/ 310  SA RE ga MA PA dh NI
      23/ 311  SA RE ga MA PA DH ni
      24/ 312  SA RE ga MA PA DH NI GR. G 25/ 334  SA RE GA ma PA dh ni
      26/ 335  SA RE GA ma PA dh NI
      27/ 336  SA RE GA ma PA DH ni  * (Khamaj)
      28/ 337  SA RE GA ma PA DH NI  * (Bilawal)

GR. H 29/ 344  SA RE GA MA PA dh ni
      30/ 345  SA RE GA MA PA dh NI
      31/ 346  SA RE GA MA PA DH ni
      32/ 347  SA RE GA MA PA DH NI  * (Kalyan)
```

MODE-ENHANCED HINDUSTANI MUSIC

This application claims the benefit of Provisional application No. 60/351,118 filed Jan. 25, 2002.

TECHNICAL FIELD

The present invention is related generally to systems of music, and more particularly, to a method and apparatus for employing mode-enhanced Hindustani Music.

BACKGROUND

Music is a combination of rhythm and melody. Melody, or raag (raaga), is generally understood as a sequence of notes, each of which is a single pitch or a single uniform sound associated with a set of frequencies, out of which one of the frequencies influences how the note sounds. Pitch is usually calculated by a measure of periodicity of waveforms based on $\pi=3.1416$.

The Western musical system contemplates 12 notes in an octave, of which 7 are "natural" notes; the remaining 5 notes are either "sharp" or "flat" notes and lie between the 7 natural notes. These notes are arranged in a sequence of pitches from left to right, whereby if a note is positioned to the right of another note, the one on the right has a higher pitch.

Scales are combinations of notes. Though it is possible to construct a large number of scales by combining the notes in different ways, in practice there are a few scales that occur more frequently than the others. The starting note of a scale is called a "root note."

A key concept in producing musical melody is the avoidance of dissonance, which is also known as overtone interferences between successive notes. Overtone interference hampers the identification of an individual note. To avoid overtone interference, a number of interval systems have been in practice, for example, Pythagorean, mean tone, equal temperament, and just intonation, which are used in the Western music systems. It should be noted that the Western musical system is typically an "equal temperament" system; successive notes are equidistant, i.e., they are separated by equal frequency ratios.

Unlike Western musical systems, the East Indian musical systems are closer to "just intonation" systems—successive notes are not equidistant. In the East Indian musical system, there are seven notes called swaras. "Raaga" is considered similar to scale, and "shruti" is similar to "root note". Shruti intervals, which are 22 in number, are thought of as the foundation of swaras. The seven notes are: Shadj, Rishabh, Gandhar, Madhyam, Pancham, Dhaivat, and Nishad. These are usually represented in an abbreviated form: Sa, Re (re), Ga, Ma, Pa, Dha, and Ni.

Mode is a way to describe the varying positions of these scales. Mode is called "thata" in Hindi. The concept of thata is old; it was described several thousand years ago as "jati." Thatas or modes are variant scales developed from a major scale simply by starting from a different note. Some of these thatas were termed Shuddha, meaning "pure" jatis, which were formed by taking a natural scale and producing other scales by simply shifting the tones. This method changed with fixing the interval for the $5^{th}$ tone, the Pancham.

The important contribution by the eminent Hindustani musicologist, Pandit Bhatkande (1860–1936), who first attempted to systematize the Hindustani music, resulted in casting all raagas into only 10 thatas, which limits the Hindustani music severely. Some attempts were made to rectify this situation and identify other possible thatas from a theoretical point of view, but these attempts were not successful. Accordingly, the Hindustani musical system can be improved by using a systematic approach to identifying additional thatas or modes.

SUMMARY

Hindustani music is found to have an additional 22 thatas (modes) that can be scientifically and accurately computed. Together with the 10 thatas already identified, these newly identified and compiled thatas make a total of 32 thatas. In a further aspect, a raaga or melody is constructed by a combination of ascending and descending notes by selecting a thata, and computing a combination including at least 5 ascending or descending notes for the thata. An additional feature of the present invention is that new raagas can be formed with the 10 thatas that are currently in use as well as from the newly identified 22 thatas. Accordingly, in one aspect, this method systemically produces new raagas.

Further, new musical instruments can be constructed by applying the newly identified thatas. Students of music may be taught new tunes based on the 32 thatas. Also discovered is a method of programming a musical instrument such as the sitar to produce tunes in accordance with the method described herein. Further, the method may be programmed to a general-purpose digital computer to produce new forms of melodious music.

BRIEF DESCRIPTION OF THE DRAWINGS

These and other features, objects and advantages of the presently described invention may be more readily understood from the following detailed description with reference to the accompanying drawing, in which, FIG. 1 illustrates 32 thatas, which can be derived from 462 thata combinations screened to use one swara.

DETAILED DESCRIPTION

As stated above, because of the difference in ratios on which the scales are fixed, the modes identified for the South Indian music are not directly applicable to the thata system of the Hindustani music. The 10 thata system, which has been in vogue, has restricted the potential of the Hindustani music. This system is based on aural recognition of the notes rather than being on a sound scientific basis. Though instruments used in the creation of Hindustani music such as the Sitar use moveable frets to enable the creation of several types of tonal scales, typical Hindustani music has not deviated from the traditional 10 thata system because other thatas have not been identified or compiled in an accurate way to enable proper teaching or learning.

Thatas form the basis of a raag in the Hindustani music. A thata lays down the conditions to generate a particular melody from the notes of a thata. A thata may be used to generate a melody (raaga) by choosing a particular set of notes as per the definition of Raagas. From a thata one can create further combinations of raagas. It should be noted that a thata is a precondition to the creation of a raaga. Using the existing 10-thata system can result in a limited number of raagas, and in practice there are about 100 raagas, and it is believed that this has restricted the scope and opportunity for the growth of Hindustani music. Of the 32 thatas identified herein, there are newly identified 22 thatas.

It has been observed that a scientific and mathematical approach to identify and compile new thatas to be used in Hindustani music system would enhance the state of the art.

Accordingly, a theoretical model has been created using mathematical analysis and a scientific approach to compile additional thatas to enrich the Hindustani music system. The methodology used first creates a set of rules, which could be applied in a systematic way.

As is common with the traditional Hindustani music, a thata includes a selection from 7 swaras. Advantageously, these 7 swaras are selected from the set of 12 swaras used in Hindustani music, namely, {SA, re, RE, ga, GA, ma, AM, PA, dh, DH, ni, NI}. In the notation used herein, lowercase letters indicate that the note is a flat (komal) and uppercase letters indicate pure note (shuddha), except that the note MA is a sharp note (teevra). Importantly, the notes SA and PA are mandatory in every thata created. Each thata includes a selection of at most only one form of each of the 7 basic swaras, i.e., either shuddha, komal or teevra form of a particular swara.

Raggas In Hindustani Music

Raagas are melody types. As stated above, the raaga system is a method of organizing tunes based on certain natural principles. Tunes in the same raaga use the same (nominal) swaras in various combinations and with practice the listener can pick up the similarity. Each raaga has a swaroop (a musical form or image) that is defined by the swaras used, the gamakas given to these swaras, the sequence in which the swaras occur.

Notes are classified as vadi, samvadi, anuvadi and vivadi. The note most frequently used in a raaga is called vadi. Samvadi is a note separated by 8 or 12 srutis from vadi. Vivadi is a note in opposition to vadi. Anuvadi is a neutral note. As an example, the following notes stand in vadi relationship with each other: {{SA-PA}, {RE-DHA}, {GA-NI}, {ma-SA}}.

Aroha is a sequence of swaras used in a raaga in the ascending passages i.e. as the pitch goes up. Avaroha is the sequence of swaras to be used in descent. The aroha and avaroha (or the scale) of a raaga provide an outline upon which the rest of the raaga is formed. To achieve a raaga, more that simple selection of aaroha or avaroha is necessary. Thus, it can be seen that raagas are not simply abstract collections of swaras that occur together to produce a tune. Each raaga has a distinct image or swaroop, and this is what defines a raaga. An arbitrary selection of a set of swaras is unlikely to produce a distinct raaga swaroop and this is the reason for attributing the foundations of the raaga system to nature. From the viewpoint of a listener, a realization of the raaga swaroop means that some of the qualities of the music can be anticipated and this contributes greatly to listening pleasure.

The well-known raagas are the products prior work by eminent musicians. Each raaga has associated with it a feeling that it induces in the listener and the performer. Hours of dedicated practice with a single raaga results in the realization of the raaga swaroopa on the part of the performer and this is often referred to as obtaining a Dharshan of that particular raaga. The unfortunate consequence of this is that various performers have slightly different mental concepts of a single raaga and this is manifest in their music. This adds to the creation of music immensely, which is why East Indian music is typically not learnt from a book but through a Guru (master) who can portray the raaga swaroop in such a manner that the pupil can pick it up. This form of instruction from a master is called Guru-Sishya Parampara.

Further notice should be made that a thata has aaroha (ascending order of notes) and avaroha (descending order of notes) but in general no vadi/samvadi. A thata with vadi/samvadi is a sampurna-sampurna raaga.

Types Of Raggas (Base And Derived)

Raagas fall into two types, base or Janaka (i.e., "mother" raaga) raagas and derived or janya (i.e., offspring) raagas. Janaka raagas have a formal structure and follow a fairly rigid scheme of scientific organization whereas the janya raagas are rooted in usage and evolve with the music. In fact many janya raagas change their character over time. Janya raagas are derived from the base raagas through various means as described subsequently. Janaka raagas are identified by the fact that they use all seven swaras and the aroha and avaroha are always {Sa,Ri, Ga, Ma, Pa, Da,Ni,Sa} and {Sa,Ni,Da,Pa,Ma,Ga,Ri,Sa}. This type of aroha and avaroha is denoted by the term sampoorna, indicating completeness. The existence of multiple swara sthanas for Ri, Ga, Ma, Da and Ni implies that by collecting combinations of these, we can form a system of Janakas. Any raaga that does not belong to the Janaka system is a janya raaga. Janya raagas are characterized by missing notes in the aroha and/or avaroha {e.g., Sa-Ri-Ga-Pa-Da-Sa}, the use of twisted progressions {e.g., Sa-Ga-Ri-Ma-Pa-Da-Ni-Sa}.

The definition of Janaka given above is a currently accepted one. In the past, Janakas have been defined in other ways, sometimes incompatible with the sampoorna characteristic. In the invented scheme, the base raagas arise out of systematic permutation of the twelve swaras into the seven swara sthanas (positions). Seen this way, the novel scheme is more scientific compared to the current organization of the Hindustani music.

As noted before, all base raagas employ a complete (sampoorna) aroha-avaroha structure. The lower tetrachord (purvang) of a base raaga refers to the lower half of Aroha-Avaroha, namely Sa-Ri-Ga-Ma and upper tetrachord (uttarang) refers to the upper half or Pa-Dha-Ni-Sa.

A first and simplest way to derive a raaga from a base raaga is to leave out one or more swaras in aroha or avaroha. This method results in an upang raaga. Thus, one can see that derived raagas form somewhat of a proper subset of a base raaga. These missing swaras are sometimes called vajra. Other ways of creating derived raagas include twisting the progression of aroha and/or avaroha.

Creating New Hindustani Raggas Using The Novel Method

Using these rules, a novel set of identifiable thatas can be compiled and used to create new raagas as follows. First, an individual one of the identified thatas is taken. For the sake of discussion, let us assume that we select a thata of the form {SA, RE, GA, ma, PA, DH, NI, SA}. It can be easily seen that this thata has 8 notes, one more than the 7 notes in the thatas identified above. This is because a raaga has an eighth note, SA appended to it to complete the tune.

This thata has 7 notes. As mentioned a thata has both ascending (aroha) and descending (avaroha) orders of notes. Raaga in addition needs vadi/samvadi to manifest its swaroop. Accordingly, we can easily see that a descending order of the selected set of notes (thata) can be constructed as, {SA, Ni, DH, PA, ma, GA, RE, SA}. Thus, this example shows a complete raaga with a total of 14 unique notes (swaras), and therefore, this embodiment is called a Sampurna-Sampurna raaga.

Other variations—in terms of the number and types of notes in each raaga—are also possible. In particular, a raaga cannot be created unless there are at least 5 notes (swara) and as described above, a raaga has at most 7 unique notes. Therefore, it can be easily seen that several raagas can be compiled using all possible combinations of 5, 6 and 7 unique notes as shown in Table 1.

TABLE 1

Raaga Types as Combinations of Different Number of Notes

| No. | Ascending (Aaroha) | Descending (Avaroha) | Total notes | Type of raaga |
|---|---|---|---|---|
| 1. | 5 | 5 | 10 | Odava-Odava |
| 2. | 5 | 6 | 11 | Odava-Shadava |
| 3. | 5 | 7 | 12 | Odava-Sampurna |
| 4. | 6 | 5 | 11 | Shadava-Odava |
| 5. | 6 | 6 | 12 | Shadava-Shadava |
| 6. | 6 | 7 | 13 | Shadava-Sampurna |
| 7. | 7 | 5 | 12 | Sampurna-Odava |
| 8. | 7 | 6 | 13 | Sampurna-Shadava |
| 9. | 7 | 7 | 14 | Sampurna-Sampurna |

Thus, it can be seen from the table that each thata can result in exactly 9 types of raagas. Further, each raaga uses related notes forming an ordered pair called vaadi and samvaadi, for example, the following notes are 'samvaadis' to each other: {{SA,PA}, {RE,DH}, {GA,NI}, {ma,SA}}.

The rationale for this novel method is as follows. First, it has been observed that the currently known 10 thatas are inadequate to express the full flavor of Hindustani music. Because a thata contains 7 notes, it can be seen that one can select 7 out of the 12 notes to result in a possible valid 792 thata combinations. Of these, every new thata must have the note Sa fixed, and therefore, this is tantamount to a selection of 6 out of 11 notes to arrive at 462 note combinations. These 462 note combinations are given serial numbers 1:462.

Referring to table 2 below, the known 10 thatas are grouped in 8 groups A–G, each containing 4 thatas. The reference numbers given relate to the possible 462 valid note combinations of which 8 groups of 4 thatas each are identified by applying the rules of construction enunciated herein. For example, 1–4 (173–176) indicates that the group of four thatas (1–4) actually belongs to serial numbers (173–176) of the 462 possible valid thata combinations.

TABLE 3

Distribution of Known Thatas Among 8 Identified Groups

| Number & Names of Group # | Number of Thatas |
|---|---|
| 4 (A, D, E, G) | 2 (8) |
| 2 (B, H) | 1 (2) |
| 2 (C, F) | 0 (0) |
| 8 Groups | 3 (10) |

The other combinations of notes are non-existent in the current Hindustani musical system. This deficiency is rectified by adding new thatas as shown in FIG. 1, which shows 10 thatas already known and 22 additional thatas invented herein.

Thus, the invented method includes applying the following rules to isolate new and unique thatas. First note Sa is fixed. Then 6 out of the possible 11 remaining notes are taken. Notes Sa and Pa are fixed. Then only one form of each of the following variable swaras (notes) is taken: {Re, Ga, Ma, Dha, Ni}. Having selected the 7 notes, one can create 22 new thatas.

FIG. 1 depicts 32 new thatas, which result from this process. Of these, 10 thatas are currently in vogue in Hindustani music. But these 10 thatas, which are identified by an asterisk, are not developed in a scientific way; rather, they were derived empirically.

For every thata, there are 22 possible combinations of notes in ascending and in descending order. Noting that a raaga has both ascending and descending set of notes, and further noting that a raaga may contain at least 5 notes—i.e., it can have 5, 6 or 7 notes—one can see that 484 distinct raagas are possible for each new thata. These are the janya (derived) raagas. From these 484 combinations, a total of 10,648 new raagas can be created. The illustration below shows 32 sampurna-sampurna raagas (each containing 7 notes in both ascending and descending order) based on 32 thatas, which include the 22 newly derived thatas and the 10 thatas in vogue. The numbers preceding each thata indicate the sequence numbers in the format x/y where x is the sequence number of the newly identified thata, and y is the sequence number of one of the 462 valid thata combinations out of which the 22 new thatas are identified.

TABLE 2

Architecture of Hindustani Music And Room For Innovation

| Groups | Reference No. | Notes in first half | Notes in second half | Existing thatas | Scope for Improvement |
|---|---|---|---|---|---|
| A | 1–4(173–176) | SA re ga ma | 4 variable, PA, dh, ni | **2 | 2 to make 4 |
| B | 5–8(183–186) | SA re ga MA | 4 variable, PA, dh, ni | *1 | 3 to make 4 |
| C | 9–12(208–211) | SA re GA ma | 4 variable, PA, dh, ni | 0 | 4 to make 4 |
| D | 13–16(218–221) | SA re GA MA | 4 variable, PA, dh, ni | **2 | 2 to make 4 |
| E | 17–20(299–302) | SA RE ga ma | 4 variable, PA, dh, ni | **2 | 2 to make 4 |
| F | 21–24(309–312) | SA RE ga MA | 4 variable, PA, dh, ni | 0 | 4 to make 4 |
| G | 25–28(334–337) | SA RE GA ma | 4 variable, PA, dh, ni | **2 | 2 to make 4 |
| H | 29–32(344–347) | SA RE GA MA | 4 variable, PA, dh, ni | *1 | 3 to make 4 |
| 8 Groups: 32 Thatas | | Swara combinations | | **10 | 22 to make 32 |

An analysis of the table 2 shows that each of the eight groups has four thatas. As seen from the table below, two groups (C, F) no known thata exists, while remaining two groups (B, H) have 1 thata each, whereas four groups (A, D, E, G) have two thatas each. These are summarized in table 3.

S.No. S-S RAAGA
1/173 Aaroha: SA re ga ma PA dh ni SA
  Avaroha: SA ni dh PA ma ga re SA
  Vadi: ma Samvadi: SA
2/174 Aaroha: SA re ga ma PA dh NI SA
  Avaroha: SA NI dh PA ma ga re SA
  Vadi: ma Samvadi: SA 3/175 Aaroha: SA re ga ma PA DH ni SA
Avaroha: SA ni DH PA ma ga re SA
Vadi: ma Samvadi: SA
4/176 Aaroha: SA re ga ma PA DH NI SA
Avaroha: SA NI DH PA ma ga re SA
Vadi: ma Samvadi: SA
5/183 Aaroha: SA re ga MA PA dh ni SA
Avaroha: SA ni dh PA MA ga re SA
Vadi: MA Samvadi: SA
6/184 Aaroha: SA re ga MA PA dh NI SA
Avaroha: SA NI dh PA MA ga re SA
Vadi: MA Samvadi: SA
7/185 Aaroha: SA re ga MA PA DH ni SA
Avaroha: SA ni DH PA MA ga re SA
Vadi: MA Samvadi: SA
8/186 Aaroha: SA re ga MA PA DH NI SA
Avaroha: SA NI DH PA MA ga re SA
Vadi: MA Samvadi: SA
9/208 Aroha: SA re GA ma PA dh ni SA
Avaroha: SA ni dh PA ma GA re SA
Vadi: SA Samvadi: PA
10/209 Aroha: SA re GA ma PA dh NI SA
Avaroha: SA NI dh PA ma GA re SA
Vadi: GA Samvadi: NI
11/210 Aroha: SA re GA ma PA DH ni SA
Avaroha: SA ni DH PA ma GA re SA
Vadi: SA Samvadi: PA
12/211 Aroha: SA re GA ma PA DH NI SA
Avaroha: SA NI DH PA ma GA re SA
Vadi: GA Samvadi: NI
13/218 Aroha: SA re GA MA PA dh ni SA
Avaroha: SA ni dh PA MA GA re SA
Vadi: SA Samvadi: PA
14/219 Aroha: SA re GA MA PA dh ni SA
Avaroha: SA ni dh PA MA GA re SA
Vadi: SA Samvadi: PA
15/220 Aroha:SA re GA MA PA DH ni SA
Avaroha: SA ni DH PA MA GA re SA
Vadi: SA Samvadi: PA
16/221 Aroha: SA re GA MA PA DH NI SA
Avaroha: SA NI DH PA MA GA re SA
Vadi: GA Samvadi: NI
32 S-S (7:7) RAAGAS
17/299 Aroha: SA RE ga ma PA dh ni SA
Avaroha: SA ni dh PA ma ga RE SA
Vadi: SA Samvadi: PA
18/300 Aroha: SA RE ga ma PA dh NI SA
Avaroha: SA NI dh PA ma ga RE SA
Vadi: SA Samvadi: PA
19/301 Aroha: SA RE ga ma PA DH ni SA
Avaroha: SA ni DH PA ma ga RE SA
Vadi: RE Samvadi: DH
20/302 Aroha: SA RE ga ma PA DH NI SA
Avaroha: SA NI DH PA ma ga RE SA
Vadi: RE Samvadi: DH
21/309 Aroha: SA RE ga MA PA dh ni SA
Avaroha: SA ni dh PA MA ga RE SA
Vadi: SA Samvadi: PA
22/310 Aroha: SA RE ga MA PA dh NI SA
Avaroha: SA NI dh PA MA ga RE SA
Vadi: SA Samvadi: PA
23/311 Aroha: SA RE ga MA PA DH ni SA
Avaroha: SA ni DH PA MA ga RE SA
Vadi: RE Samvadi: DH
24/312 Aroha: SA RE ga MA PA DH NI SA
Avaroha: SA NI DH PA MA ga RE SA
Vadi: RE Samvadi: DH
32 S-S (7:7) RAAGAS
25/334 Aroha: SA RE GA ma PA dh ni SA
Avaroha: SA ni dh PA ma GA RE SA
Vadi: SA Samvadi: PA
26/335 Aroha: SA RE GA ma PA dh NI SA
Avaroha: SA NI dh PA ma GA RE SA
Vadi: GA Samvadi: NI
27/336 Aroha: SA RE GA ma PA DH ni SA
Avaroha: SA ni DH PA ma GA RE SA
Vadi: RE Samvadi:DH
28/337 Aroha: SA RE GA ma PA DH NI SA
Avaroha: SA NI DH PA ma GA RE SA
Vadi: GA Samvadi: NI
29/344 Aroha: SA RE GA MA PA dh ni SA
Avaroha: SA ni dh PA MA GA RE SA
Vadi: SA Samvadi: PA
30/345 Aroha: SA RE GA MA PA dh NI SA
Avaroha: SA NI dh PA MA GA RE SA
Vadi: GA Samvadi: NI
31/346 Aroha: SA RE GA MA PA DH ni SA
Avaroha: SA ni DH PA MA GA RE SA
Vadi: SA, or RE Samvadi: PA, or DH
32/347 Aroha: SA RE GA MA PA DH NI SA
Avaroha: SA NI DH PA MA GA RE SA
Vadi: SA or RE or GA Samvadi: PA or DH or NI The foregoing describes a scientific and logical basis for restructuring thata and Janya Raagas in Hindustani music system and expands the Hindustani music to contain 22 new thatas and 10,648 raagas. It is believed that this helps create additional melodies. Further, a programmed computer can be developed to create new raagas in the Hindustani music based on the novel thata combinations. Other instruments, such as fretted instruments may be created using the principles described herein. Accordingly, the principles disclosed herein should not be limited to those embodiments specifically stated herein.

What is claimed is:

1. A method of defining new thatas for Hindustani music, the method comprising the step of:

selecting 7 notes out of a possible 12 notes from the set {SA, re, Re, ga GA, ma, MA, PA, dh, DH, ni, NI}; wherein only one form of a variable swara from each of the sets of subsets in the set {{RE,re}, {ga, GA}, {ma, MA}, {dh, DH}, {ni, NI}} is selected; and wherein the positions of notes Sa and Pa are fixed.

2. A method of creating a new raag in Hindustani music, said method comprising the steps of:

defining at least one new thata, said thata including 7 notes; wherein the 7 notes are selected out of a possible 12 notes from the set {SA, re, RE, ga, GA, ma, MA, PA, dh, DH, ni, NI}; wherein only one form of a variable swara from each of the subsets in the set {{RE,re}, {ga, GA}, {ma, MA}, {dh, DH}, {ni, NI}}, is selected; and wherein the positions of notes Sa and Pa are fixed;

defining a raag for the defined thata, by deriving at least one set of notes in an ascending order (aaroha notes) and at least one set of notes in a descending order (avaroha notes), each said set of aaroha notes and avaroha notes comprising at least 5 notes wherein the 5 notes include one fixed note Sa and 4 notes selected from the selected 7 notes of the defined thata;

for the defined raag, selecting as a primary note a note most frequently used in the raag, and a secondary note, wherein the secondary note is four or five positions away from the selected primary note; and creating a raag using variants of the selected thata.

3. The method of claim 2, further comprising the step of:
identifying at least 22 new thatas; and
selecting one thata from a set of 22 identified thatas.

4. The method of claim 3, where the step of identifying at least 22 thatas comprises the steps of:
selecting 7 notes out of a possible 12 notes; and
selecting only one form of a variable swara from each of {Re, Ga, Ma, Dha, Ni}.

5. The method of claim 4, where the 7 selected notes include notes Sa and Pa as fixed notes.

* * * * *